United States Patent
Wässingbo

(10) Patent No.: US 9,607,196 B2
(45) Date of Patent: Mar. 28, 2017

(54) TRANSMISSION REGULATION OF TAG READERS

(71) Applicant: Sony Corporation, Tokyo (JP)

(72) Inventor: Tomas Wässingbo, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 116 days.

(21) Appl. No.: 14/426,675

(22) PCT Filed: Apr. 10, 2014

(86) PCT No.: PCT/JP2014/002070
§ 371 (c)(1),
(2) Date: Mar. 6, 2015

(87) PCT Pub. No.: WO2015/155809
PCT Pub. Date: Oct. 15, 2015

(65) Prior Publication Data
US 2016/0259956 A1    Sep. 8, 2016

(51) Int. Cl.
*G06K 7/10* (2006.01)
*G06K 7/00* (2006.01)
*H04W 4/02* (2009.01)
*H04W 52/02* (2009.01)
*G06Q 10/08* (2012.01)
(Continued)

(52) U.S. Cl.
CPC ....... *G06K 7/10475* (2013.01); *G06K 7/0008* (2013.01); *G06K 7/10386* (2013.01); *G06Q 10/08* (2013.01); *G06Q 50/28* (2013.01); *H04W 4/023* (2013.01); *H04W 4/028* (2013.01); *H04W 52/0235* (2013.01); *H04W 4/008* (2013.01)

(58) Field of Classification Search
CPC ............. G06K 7/0008; G06K 19/0723; G06K 7/10039; G06K 7/10366; G06K 7/10108; G06K 7/10297; G06K 2017/0045
USPC ....................................... 340/10.32
See application file for complete search history.

(56) References Cited

U.S. PATENT DOCUMENTS

| 2005/0099269 | A1* | 5/2005 | Diorio | G06K 19/0723 340/10.51 |
| 2013/0157569 | A1* | 6/2013 | Torvmark | H04W 4/008 455/41.2 |
| 2014/0062699 | A1* | 3/2014 | Heine | G06Q 10/087 340/572.1 |

FOREIGN PATENT DOCUMENTS

GB    2 443 864 A    5/2008

OTHER PUBLICATIONS

International Search Report and Written Opinion of the International Searching Authority, PCT Application No. PCT/JP2014/002070, Jan. 8, 2015.

* cited by examiner

*Primary Examiner* — Mark Blouin
(74) *Attorney, Agent, or Firm* — Myers Bigel, P.A.

(57) ABSTRACT

A server may compare transmission reports received from mobile tag readers to a reporting rule. Each transmission report includes a reported location of the respective mobile tag reader when the respective mobile tag reader received a wireless transmission from a tag. Responsive to a determination that the transmission reports satisfy the reporting rule, an instruction may be generated that instructs a mobile tag reader to reduce how often tag transmission reports are sent to the server. Mobile tag readers may be selected to receive the instruction based on the reported location. The instruction may be sent to the selected mobile tag readers. The (Continued)

sending of transmission reports by tag readers may be reduced.

20 Claims, 11 Drawing Sheets

(51) Int. Cl.
*G06Q 50/28* (2012.01)
*H04W 4/00* (2009.01)

TRANSMISSION REGULATION OF TAG READERS

CROSS REFERENCE TO RELATED APPLICATION

This application is a 35 U.S.C. §371 national stage application of PCT International Application No. PCT/JP2014/002070, filed on 10 Apr. 2014, the disclosure and content of which is incorporated by reference herein in its entirety.

TECHNICAL FIELD

Embodiments of this invention relate to tags and tag readers.

BACKGROUND ART

Radio Frequency Identification (RFID) tags may be embedded in or attached to items that can store identification information and other details. Tags may be small devices, such as a label, with a miniature embedded antenna. A tag reader may interrogate the tag by transmitting an RFID signal, which energizes the embedded antenna to provide power for the tag to transmit a responsive RFID signal to the reader. Some tags may have a power source and/or circuitry to provide transmissions or broadcasts to be picked up by tag readers. Tag readers may be mobile terminals.

Tag readers may receive transmissions from tags and report the transmissions to a server in a network cloud. However, if there are many tag readers in a same location sending frequent transmission reports, spectral bandwidth and battery power of the tag readers may be exhausted more than necessary.

SUMMARY

According to some embodiments of the present invention, a server may include a processor and a memory coupled to the processor and comprising computer readable program code embodied in the memory that when executed by the processor causes the processor to perform operations. The operations may include comparing transmission reports received from one or more mobile tag readers to a reporting rule. Each transmission report may include data received by a respective mobile tag reader through a wireless transmission from a tag and a reported location of the respective mobile tag reader. The operations may also include, responsive to a determination that the transmission reports satisfy the reporting rule, generating an instruction that instructs a mobile tag reader to reduce sending of transmission reports to the server. The operations may further include selecting one or more mobile tag readers to receive the instruction based on the reported location and sending the instruction to the selected one or more mobile tag readers.

In some embodiments, the operations may include comparing a number of the transmission reports received for the reported location during a time period to a threshold number defined by the reporting rule. The instruction may be generated responsive to a determination that the number of transmission reports satisfies the threshold number.

In some embodiments, the operations may also include comparing a frequency of transmission reports sent by a mobile tag reader to a threshold frequency defined by the reporting rule. The instruction may be generated responsive to a determination that the frequency of transmission reports sent by the mobile tag reader satisfies the threshold frequency.

In some embodiments, the operations may include selecting a group of the one or more mobile tag readers that are within a geographical region that is defined based on the reported location.

In some embodiments, the instruction may instruct the selected mobile tag readers to halt sending of transmission reports for a time period. The instruction may also instruct the selected one or more mobile tag readers to reduce a frequency of transmission reports sent to the server while within the geographical region.

In some embodiments, the operations may include sending, based on a reporting plan associated with the reporting rule, a resume instruction to the selected one or more mobile tag readers instructing the selected one or more mobile tag readers to no longer reduce how often transmission reports are sent to the server, selecting other one or more mobile tag readers based on the reporting plan and sending the instruction to the other one or more mobile tag readers.

In some embodiments, the operations may include selecting one or more mobile tag readers that are predicted to be in a geographical region defined based on the reported location. The instruction may instruct the one or more mobile tag readers to reduce how often transmission reports are sent to the server within a threshold distance of the reported location.

In some embodiments, the instruction may further instruct the selected one or more mobile tag readers to instruct the tag sending the wireless transmissions to reduce how often wireless transmissions are broadcast.

In some embodiments, a method may include comparing, at a computing device, transmission reports received from one or more mobile tag readers to a reporting rule. Each transmission report may include data received by a respective mobile tag reader through a wireless transmission from a tag and a reported location of the respective mobile tag reader. The method may also include, responsive to a determination that the transmission reports satisfy the reporting rule, generating an instruction that instructs a mobile tag reader to reduce sending of transmission reports to the server. The method may further include selecting one or more mobile tag readers to receive the instruction based on the reported location and sending the instruction to the selected one or more mobile tag readers.

In some embodiments, the method may include comparing a number of the transmission reports received for the reported location during a time period to a threshold number defined by the reporting rule. The instruction may be generated responsive to a determination that the number of transmission reports satisfies the threshold number.

In some embodiments, the method may also include comparing a frequency of transmission reports sent by a mobile tag reader to a threshold frequency defined by the reporting rule. The instruction may be generated responsive to a determination that the frequency of transmission reports sent by the mobile tag reader satisfies the threshold frequency.

In some embodiments, the method may include selecting a group of the one or more mobile tag readers that are within a geographical region that is defined based on the reported location.

In some embodiments, the instruction may instruct the selected one or more mobile tag readers to halt sending of transmission reports for a time period. The instruction may also instruct the selected one or more mobile tag readers to reduce a frequency of transmission reports sent to the server while within the geographical region.

In some embodiments, the method may include sending, based on a reporting plan associated with the reporting rule, a resume instruction to the selected one or more mobile tag readers instructing the selected one or more mobile tag readers to no longer reduce how often transmission reports are sent to the server, selecting other one or more mobile tag readers based on the reporting plan and sending the instruction to the other one or more mobile tag readers.

In some embodiments, the method may include selecting a mobile tag reader that is predicted to be in a geographical region defined based on the reported location. The instruction may instruct the one or more mobile tag readers to reduce how often transmission reports are sent to the server within a threshold distance of the reported location.

In some embodiments, the instruction may further instruct the selected one or more mobile tag readers to instruct the tag sending the wireless transmissions to reduce how often wireless transmissions are broadcast.

In some embodiments, a mobile communication terminal may include a processor, a communication interface coupled to the processor and a memory coupled to the processor and comprising computer readable program code embodied in the memory that when executed by the processor causes the processor to perform operations. The operations may include determining a location of the mobile communication terminal responsive to receiving a wireless transmission from a tag and sending a transmission report to a server that includes data received from the tag and the location of the mobile communication terminal. The operations may also include reducing how often transmission reports are sent to the server responsive to receiving an instruction from the server.

In some embodiments, the instruction may instruct the mobile communication terminal to halt or reduce a frequency of transmission reports sent to the server while in a geographical location that is defined based on the location.

In some embodiments, an electronic device may include a processor and a memory coupled to the processor and comprising computer readable program code embodied in the memory that when executed by the processor causes the processor to perform operations. The operations may include comparing an amount of wireless transmissions received from a location to a reporting rule. The operations may also include, responsive to a determination that the amount of wireless transmissions received from the location satisfy the reporting rule, generating an instruction that instructs another electronic device to reduce wireless transmissions and sending the instruction to a selected electronic device.

In some embodiments, the electronic device is a server and the other electronic device is a tag reader receiving wireless transmissions from tags.

In other embodiments, the electronic device is a tag reader and the other electronic device is a tag sending wireless transmissions to the electronic device.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF DRAWINGS

The accompanying drawings, which are included to provide a further understanding of the invention and are incorporated in and constitute a part of this application, illustrate certain embodiment(s) of the invention.

DESCRIPTION OF EMBODIMENTS

Figure 1:
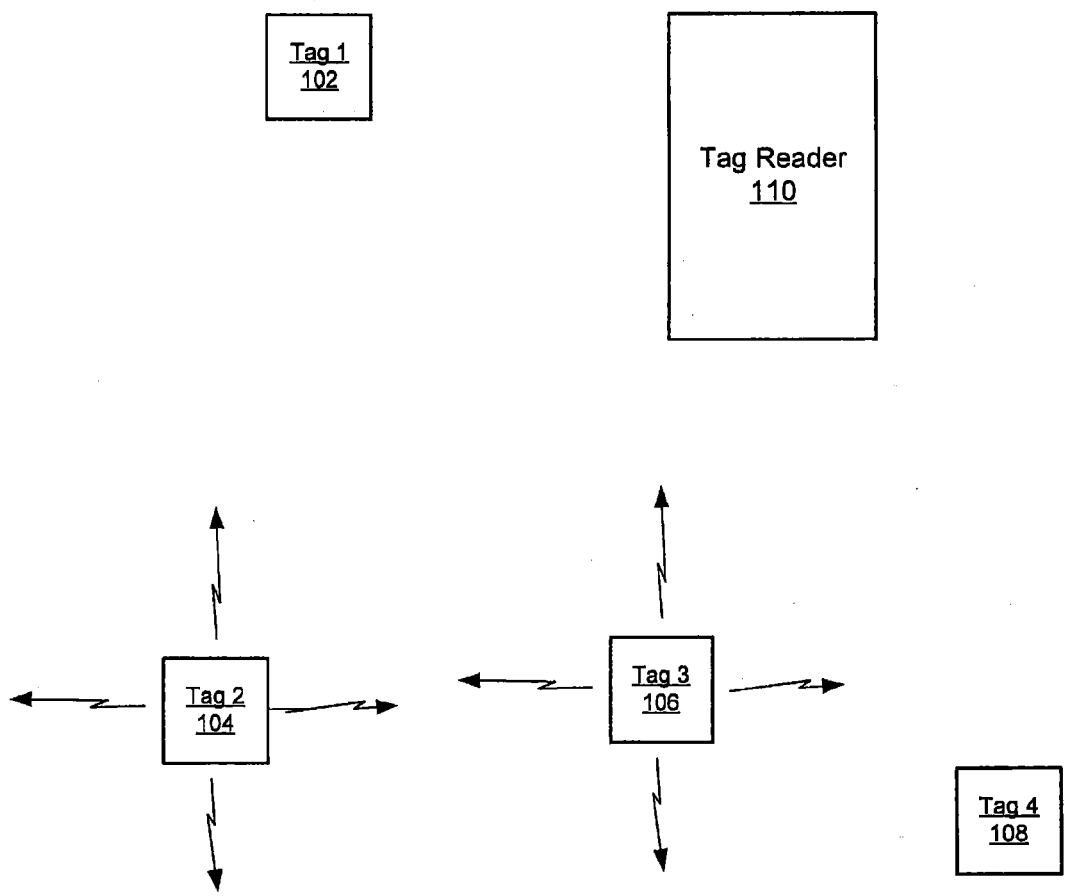
FIG. 1 is a schematic illustration of a tag reader receiving tag transmissions.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "module,"

"circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Tags may be used to track items or people for commercial or personal purposes. The tags may be attached to moveable objects and may be any shape or size that can be incorporated into or on the moveable objects. Moveable objects can include, without limitation, wallets, keys, bikes, bags, mobile telephones, clothing, automobiles or other moveable items. Tags may include devices, labels or printed inks on paper.

FIG. 1 illustrates a schematic diagram of tags 102-108 that may transmit wireless signals or broadcasts. Tags may transmit wireless signals, such as broadcasts with tag ID information. Many types of tags may lack a power source and transmit a tag ID as an inductive response to a received signal from tag reader 110. Other tags may have a power source and/or include additional circuitry for receiving signals and processing commands. For example, FIGS. 2A-2C are block diagrams illustrating a tag 200.

Figure 2A:
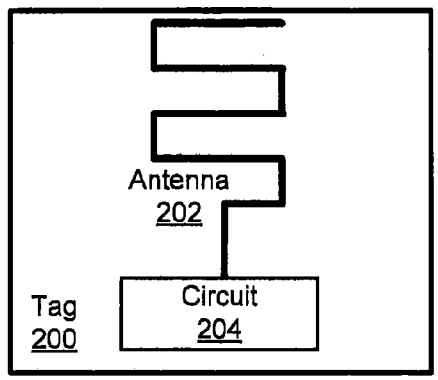
FIGS. 2A-2C are schematic block diagrams that illustrate tags.

FIG. 2A illustrates a block diagram of a simple tag that has an embedded antenna 202 that receives a tag reader signal that energizes tag 200 so that it may have power to transmit a responsive RFID signal to the tag reader. Such a tag may also include a circuit 204 for transmitting a tag ID. For example, circuit 204 may include an NFC circuit (accessory NFC circuit) that can be powered by and communicate with a UE NFC circuit using short-range high frequency wireless communication technology which enables the exchange of data between devices over about a 10 cm distance, although the NFC circuits are not limited to operating in at any defined range. The NFC circuits may communicate via magnetic field induction.

Figure 2B:
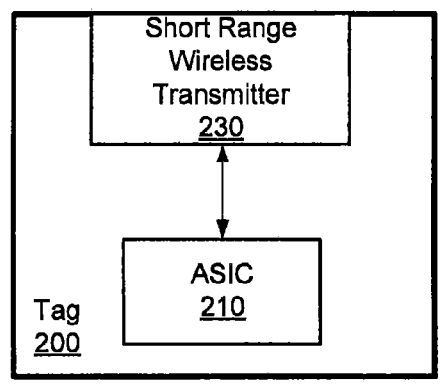

As illustrated in FIG. 2B, tag 200 may include a short-range wireless transmitter 230. Transmitter 230 may include a transmitter circuit to transmit radio frequency communication signals via an antenna system. Transmitter 230 may also include a transceiver circuit that is operative to also receive communication signals. Transmitter 230 may transmit and/or receive signals according to one or more wireless communication protocols, such as Bluetooth® protocols, ANT protocols, WLAN protocols (e.g., 802.11a, 802.11b, 802.11e, 802.11g, and/or 802.11i), or other wireless communication protocols. The transmitter 230 may be, for example, a low power Bluetooth® protocol transmitter or an ANT protocol transmitter, such as those designed and marketed by Dynastream Innovations Inc., a Cochrane, Canada based company. Tag 200 may include an Application Specific Integrated Circuit (ASIC) circuit 210 or an NFC circuit for transmitting a tag ID and/or for other logic operations.

Figure 2C:
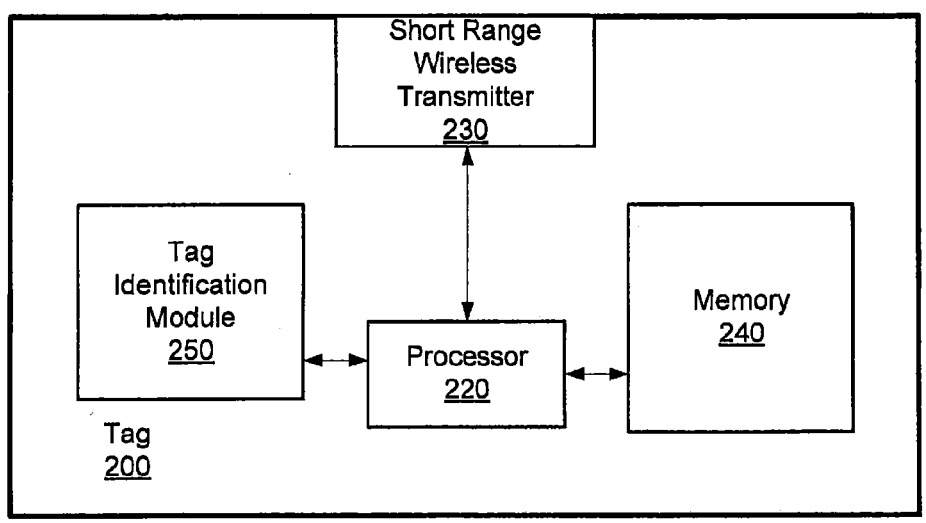

In some cases, as shown in FIG. 2C, tag 200 may also include a processor 220 that includes circuits for overall operation of the tag 200 including coordination of communications via transmitter 230. Processor circuit 220 may be configured to communicate data over the transmitter 230 according to one or more wireless communication protocols, such as Bluetooth® protocols, ANT protocols, WLAN protocols (e.g., 802.11a, 802.11b, 802.11e, 802.11g, and/or 802.11i), or other wireless communication protocols. The transmitter 230 may be, for example, a low power Bluetooth® protocol transmitter or an ANT protocol transmitter. The tag 200 of FIG. 2C may also have an NFC circuit.

Tag 200 may also include a tag identification module 250 that operates with memory 240 to store identification information, such as a unique tag ID. The tag ID may also uniquely identify a moveable object attached to the tag. For example, two different moveable objects can have respective tags that each store different ID information that can be used to distinguish the two moveable objects. In some cases, tag 200 may have a power source or may be connected to a power source.

As shown in FIG. 1, a tag reader 110, may receive any wireless broadcast transmissions from one or more of tags 102-108. In some embodiments, tag reader 110 may be a mobile communication terminal, such as mobile terminal 300 in FIG. 3. A mobile communication terminal may be, for example, a smart phone, Personal Data Assistant (PDA), laptop, tablet, scanner or any other mobile computing device that may have capabilities including cellular telecommunication, Internet/intranet access, and/or a global positioning system (GPS) service. The mobile communication terminal may also support Wi-Fi communication over a local wireless network.

Figure 3:
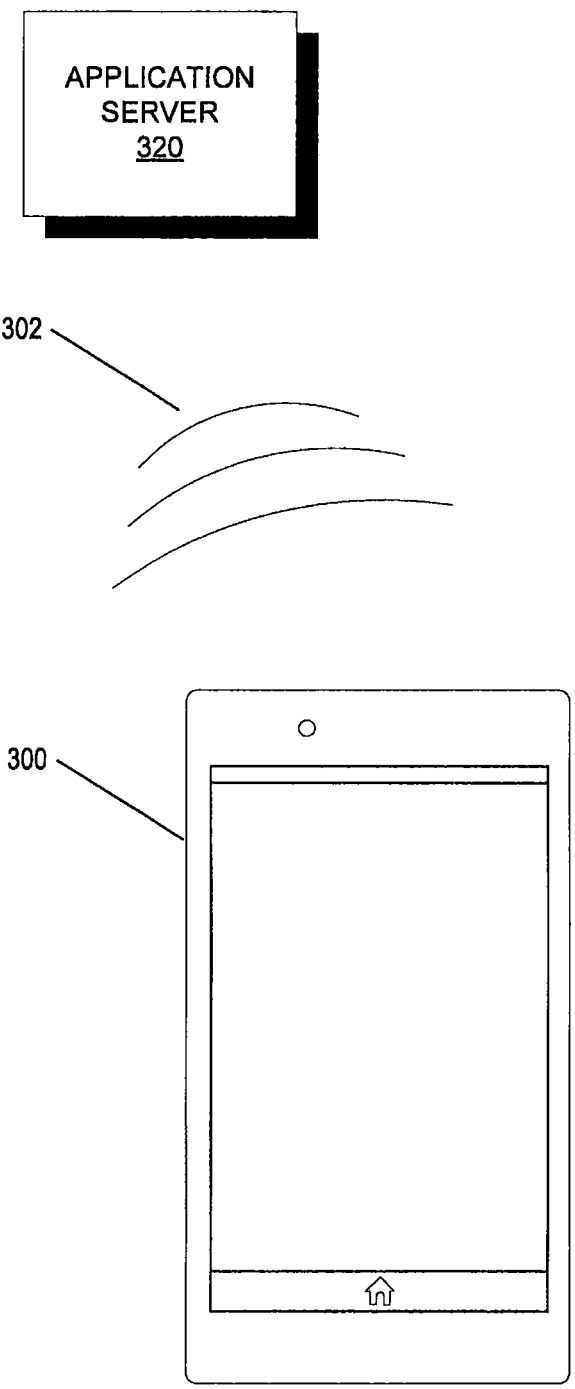
FIG. 3 is a schematic illustration of a tag reader sending transmission reports to a server.

Referring to FIG. 3, mobile terminal 300 may format and/or communicate the received tag transmissions to another computer, such as application server 320, over a network commonly employed to provide voice and data communications to subscribers. The transmissions may be included in a tag transmission report 302, which may include one or more tag IDs transmitted once or a number of times. The tag transmission report may be a single transmission to application server 320 or a number of transmissions to server 120 over a period of time. A tag transmission report may include one or more tag IDs. According to some embodiments, tag reader 110 may determine location information (or have location information determined), using for example GPS. The location information may be included in transmission report 302 and associated with the tag IDs in the transmission report. As the location information is periodically determined, it can be used to update the location information for the moveable objects. The location information can also include a time and/or history for each location of the moveable object.

Figure 4:
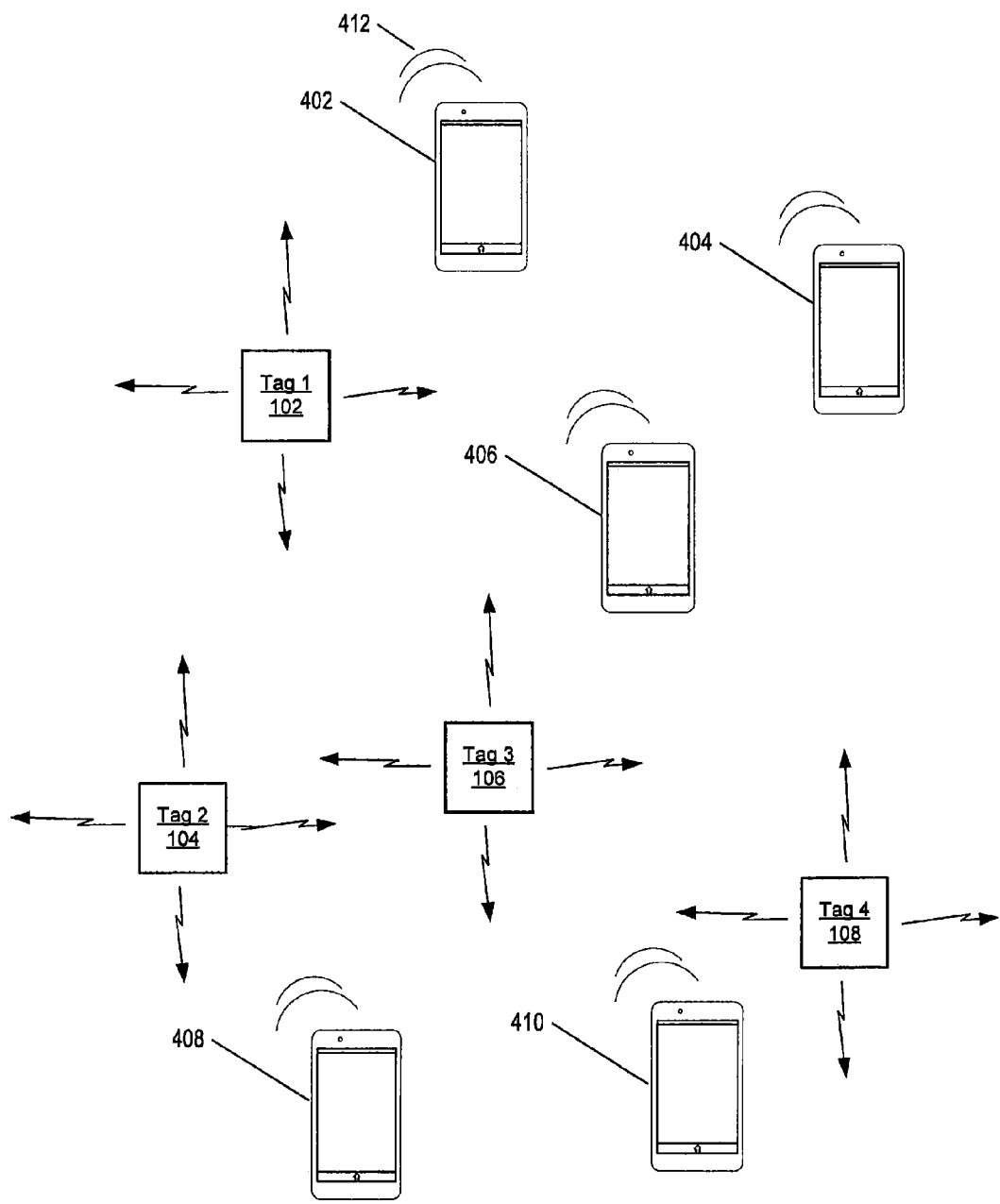
FIG. 4 is a schematic block diagram that illustrates multiple tag readers sending transmission reports from a same location.

In some locations, such as a school, park, office or commuter train station, there may be many devices that pass a certain tag and then forward data for the tag. This may result in a large number of tags being reported by a large number of tag readers. For example, FIG. 4 shows mobile terminals 402-410. If each mobile terminal sends a transmission report, such as transmission report 412 from mobile terminal 402 to application server 320, available spectral bandwidth may be exhausted. Also, all the transmission reports from this location include position-stamps that are the same because the tag readers are in the same reported location. Therefore, the redundant reports are unnecessarily draining the batteries of the mobile terminals in the location area.

Figure 5:
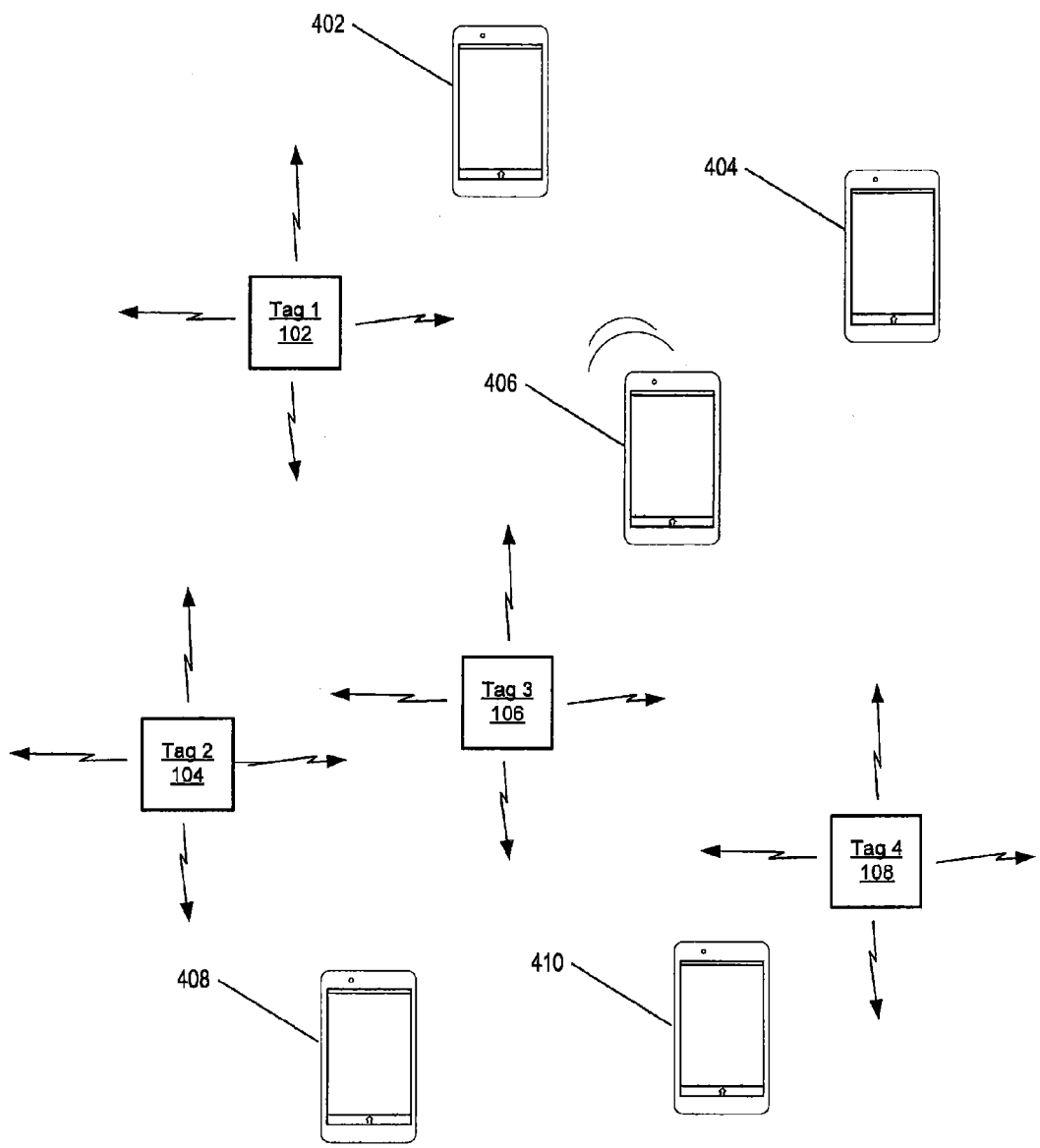
FIG. 5 is a schematic illustration of tag readers executing instructions according to some embodiments.

Embodiments of the present invention provide for monitoring and/or reducing transmission reports sent from tag readers. Tag readers may be mobile devices that have tag tracking applications or services. Based on the number of transmissions, the reported locations of the tag readers and specified reporting rules, select tag readers may be instructed to reduce the tag transmission reports being sent to application server 320. For example, FIG. 5 may represent mobile devices in a same location (or the same geographical area that is defined based on the location) as tags 102-108, which are placed on bikes parked outside an entrance to a busy commuter train terminal entrance during rush hour. Perhaps only 1 out of 5 mobile terminals, based on a historical or statistical analysis by application server 320, needs to send transmission reports to application server 320 while in this location. Therefore, as shown in FIG. 5, application server 320 has instructed mobile terminals 402, 404, 408 and 410 to halt sending of transmission reports for a period of time or while the mobile terminals are in the reported location or associated geographical area. Only mobile terminal 406 is sending transmission reports to application server 320 or to any other server.

In some cases, application server 320 may instruct mobile tag readers to reduce a frequency of transmission reports sent to application server 320. In such a case, mobile terminals 402-410 may each send tag transmission reports, but perhaps once every thirty seconds rather than every second while they are in the reported location.

Figure 6:
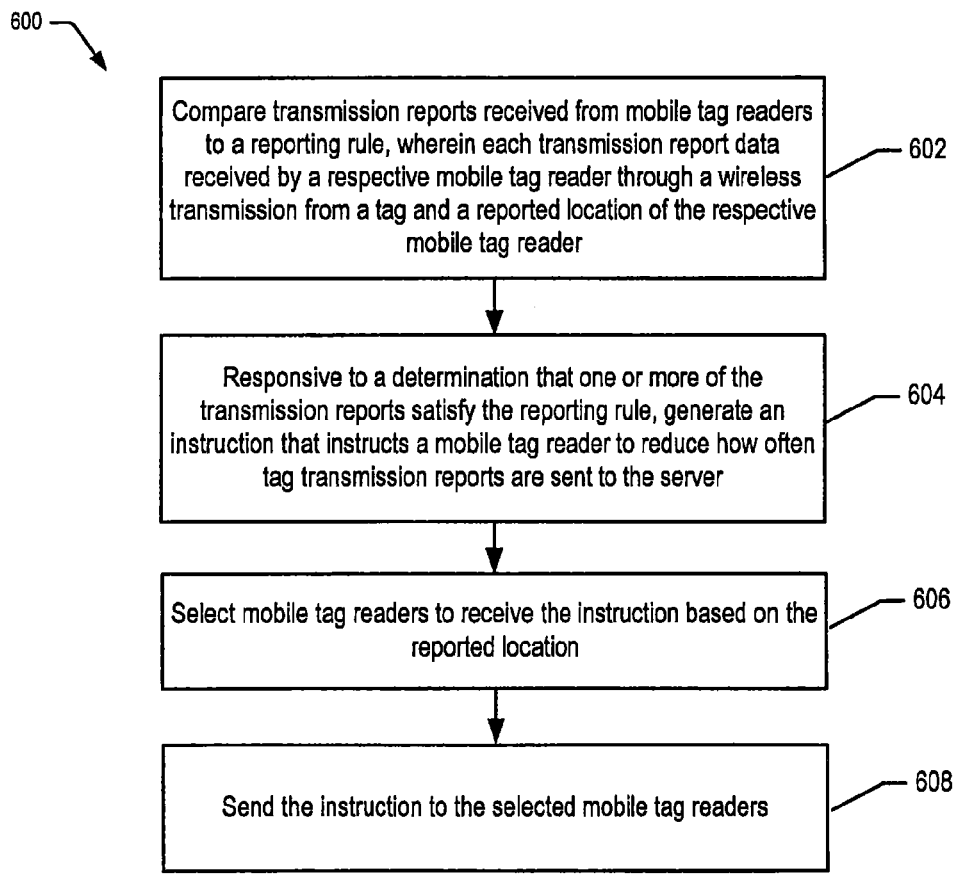
FIG. 6 is a flowchart that illustrates operations of a method for reducing sending transmission reports according to some embodiments.

FIG. 6 illustrates a flowchart of a process for reducing sending of transmission reports, according to some embodiments. In block 602, transmission reports received from one or more mobile tag readers are compared to a reporting rule. Each transmission report includes data received by a respective mobile tag reader through a wireless transmission from a tag and a reported position of the respective mobile tag reader. Such data may be a tag identification (ID), whether unique or shared, or other tag data. The reporting rule may be a rule and/or metric that would indicate that the amount, pattern and/or frequency of transmission reports received by the server from certain tag readers needs to be restricted or reduced.

In some cases, transmission reports may be sent by a tag reader to application server 320 almost simultaneously upon receiving a wireless transmission from a tag. In other cases, a wireless transmission from a tag may be time-stamped (and maybe position-stamped) upon receipt by a tag reader. However, the transmission report may be sent by the tag reader a little later. Therefore, for accuracy purposes, the reported location of the tag may be the location of the tag reader when, or at the time, it received the wireless transmission from the tag. In other cases, the location of the tag reader may be determined a time period after the wireless transmission from the tag is received.

According to some embodiments, the reporting rule may define a threshold number or threshold frequency of transmission reports to be reported from tag readers at the reported location. The location may be a precise location or a geographical area around the location that is defined based on the location and can be distinguished from other locations. The reporting rule may also include other metrics or conditions for determining whether transmission report sending should be reduced for tag readers. The conditions may be specific to a certain area at a certain time or period of time. Example conditions may include whether the area is recorded by the application server 320 as having particular characteristics. Perhaps the area is underground, in a certain building, in a government building, in a more private area, or in a place guaranteed to have many other tag readers. The conditions may also be time dependent. Weekdays at rush hour, regular business hours, certain parks on weekends, or other days and times may correspond to different reporting rules.

In response to a determination that the transmission reports satisfy the reporting rule, an instruction is generated to instruct a mobile tag reader to reduce how often transmission reports are sent to the server (block 604). The reporting rule may be satisfied, for instance, when a number of transmission reports equals or exceeds a reporting rule threshold number of transmission reports. The reporting rule may also be satisfied if a threshold number of transmissions received during a specified period of time, or a threshold frequency, has been equaled or exceeded. Other determinations may be made if certain conditions are satisfied or found to be true. For example, the frequency of transmission for a tag reader may be reduced if a tag reader reports that it is has less than a threshold remaining amount of battery power, such that it would be preferable for another tag reader in the location to send the transmission reports for tags in or passing through the location.

In some embodiments, while certain actions may be taken if the reporting rule is satisfied, no reducing action may take place when the reporting rule is not satisfied. In other embodiments, other actions may take place when the reporting rule is not satisfied. For example, how often transmission reports are sent to the server may be restored to a previous level or may be adjusted upward if the reporting rule is not satisfied.

One or more tag readers, or mobile terminals, may be selected to receive an instruction to reduce how often transmission reports are sent to the server (block 606). These selections may be based on the reported location and/or other conditions related to the location or tag readers in the location. For instance, only a subset or group of the mobile terminals in a reported location may be selected to receive the instruction. Individual mobile terminals may be selected based on a random distribution or may be prioritized based on a number of factors, including a battery power metric, a service provider, a version of the mobile terminal, a user associated with a mobile terminal, an amount of time spent in the recorded location, etc.

Application server 320 may generate and maintain reporting plans associated with one or more reporting rules, according to some embodiments. For example, a reporting plan may involve a certain percentage, subset or group of tag readers sending transmission reports for a first time period and then a different group sending transmission reports for a second time period. In some cases, each group may be assigned a different time period, amount or frequency of transmission, which may be predetermined or adjusted in real time based on whether the reporting rule is being satisfied or not. The reporting plan may also be configured based on specific conditions of the tag readers or locations.

At block 608, the instruction is sent to the selected one or more mobile terminals. As a result, fewer transmission reports are sent from tag readers in the reported location. This may also result in creation of a "white space" where few or no transmission reports are sent from the white space for a period of time. White spaces may be certain locations and/or time periods of reduced or halted transmission report sending. Application server 320 may store, create, change, predict or design white spaces based on an analysis of tag and tag reader patterns in targeted locations. Application server 320 may also generate suggestions for white spaces as it can observe in real time from where tag readers are reporting tags. The application server 320 may also assign, store and distribute instructions and reporting rules for white spaces. For example, tag readers may receive bulk instructions for white spaces in a certain radius of the tag reader such that tag readers may know when and/or how to send transmission reports at certain white spaces. For example, mobile terminals in a reported location may have received instructions to send transmission reports only every 6 minutes instead of every few seconds when entering certain restaurants, as defined by a reporting rule. In some embodiments, reporting rules may be developed based on defined white spaces.

Application server 320 may have a memory that stores data structures for such information. The data structure may record tag ids, tag readers, locations, white spaces, city maps, Wi-Fi access point information, cell tower information, topographical information, schedule information, calendar information, transmission reports or any other data for comparing transmission reports to reporting rules and performing other analyses. Multiple reporting rules and thresholds may also be stored. Some reporting rules may apply in some cases, while other reporting rules apply in other cases.

Application server 320 may also have a memory that stores computer program instructions that, when executed by a processor circuit, executes or carries out the operations described herein and shown in the figures. The memory can be a volatile memory or a non-volatile memory, such as EEPROM (flash memory), that retains the stored data while power is removed from the memory.

Figure 7:
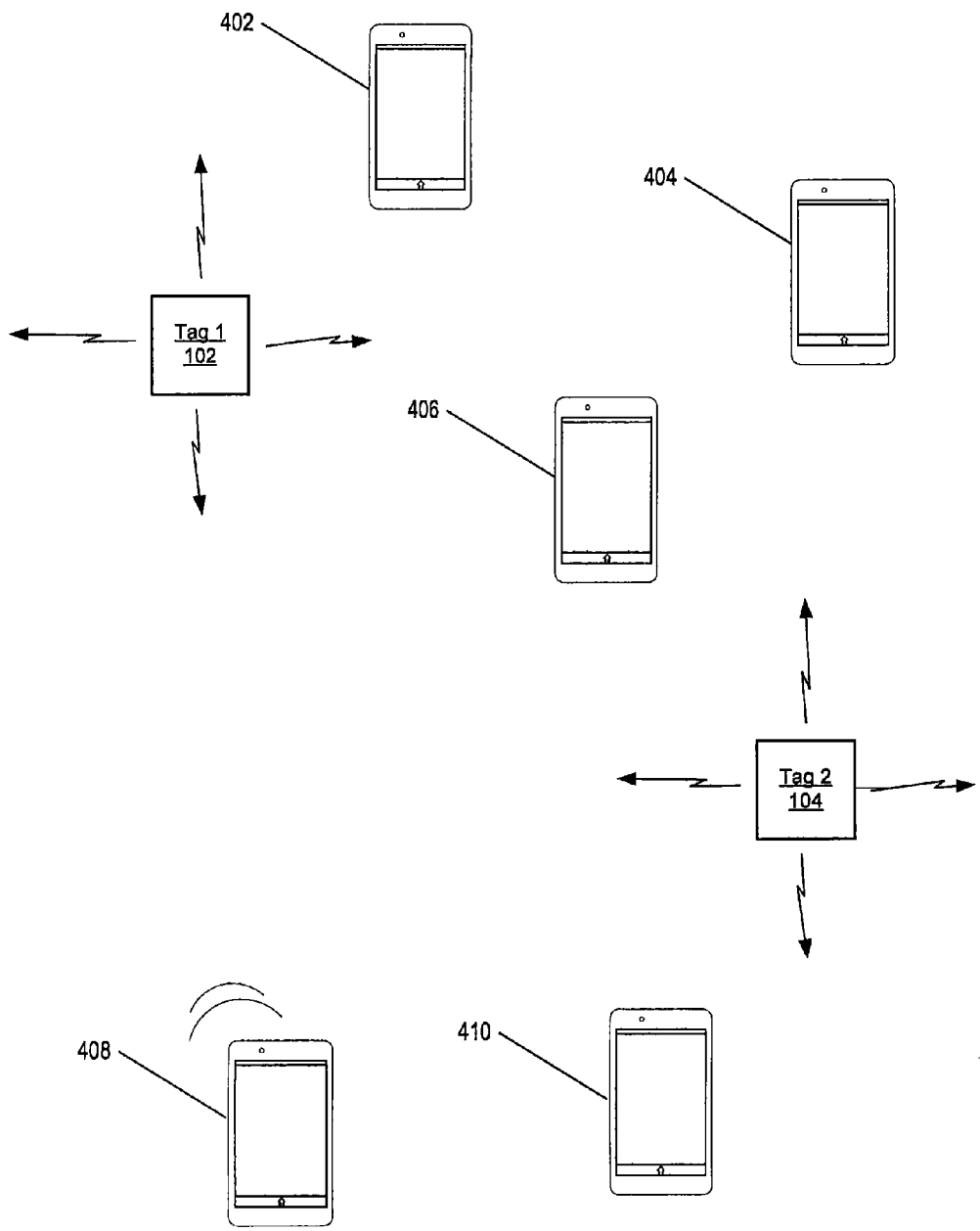
FIG. 7 is a schematic illustration of tag readers executing instructions according to some embodiments.

In some embodiments, one or more mobile terminals may be selected to halt sending transmission reports while in a certain location based on a reporting rule. For example, in FIG. 5, only mobile terminal 406 is sending transmission reports for broadcasts of tags 102-108. However, at another time or for a second duration or window of time, certain mobile terminals selected to reduce sending may be instructed to resume sending while other mobile terminals are selected to halt sending. In FIG. 7, only mobile terminal 408 is sending transmission reports during a second window of time. Of course, by this second window of time, FIG. 7 shows how tags 106 and 108 have left the location leaving only objects with tags 102 and 104. Mobile terminal 106 is no longer sending transmission reports, giving it a turn to save battery power. These instructions may be based on a reporting plan that is triggered responsive to one or more reporting rules being satisfied.

In some cases, the exit or lack of detection of tags 106 and 108 may cause application server 320 to send an instruction to other mobile terminals to resume sending transmission reports to determine or verify that tags 106 and 108 are no longer in the specified location and to listen for these tags 106 and 108 to be reported by another tag reader, perhaps at a different location.

For example, a briefcase with tag 106 may have been sitting in a particularly busy area for some time such that many tag readers passing by the briefcase tag 106 reported it being in the same location and were instructed to not send transmission reports when in the busy area. If the briefcase with tag 106 left the reported location, the tag ID of tag 106 may no longer be included in the transmission reports. Application server 320 may instruct other previously silent mobile terminals to begin sending transmission reports to help determine the new location of tag 106.

Figure 8:
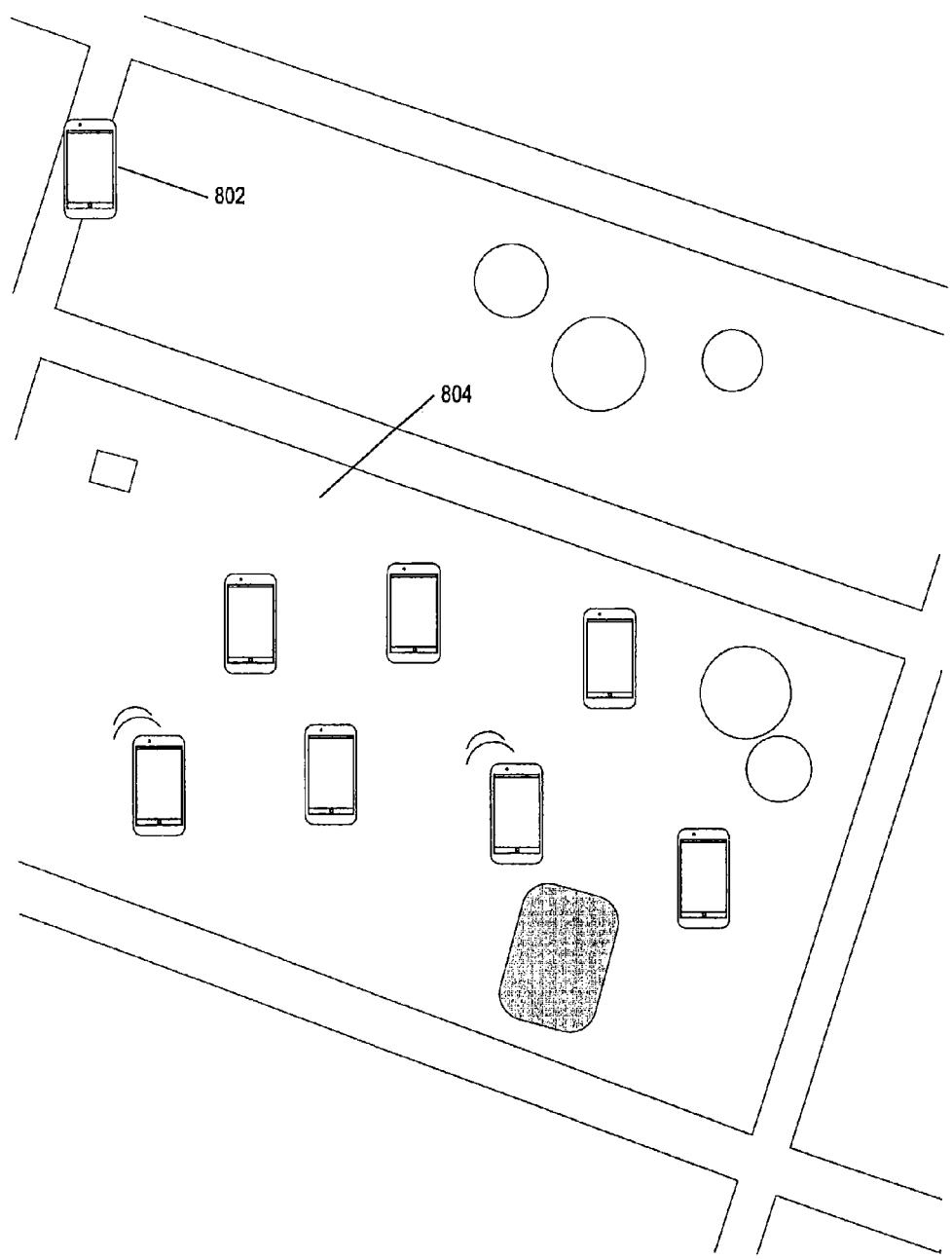
FIG. 8 is a schematic illustration of tag readers executing instructions according to some embodiments.
Figure 9:
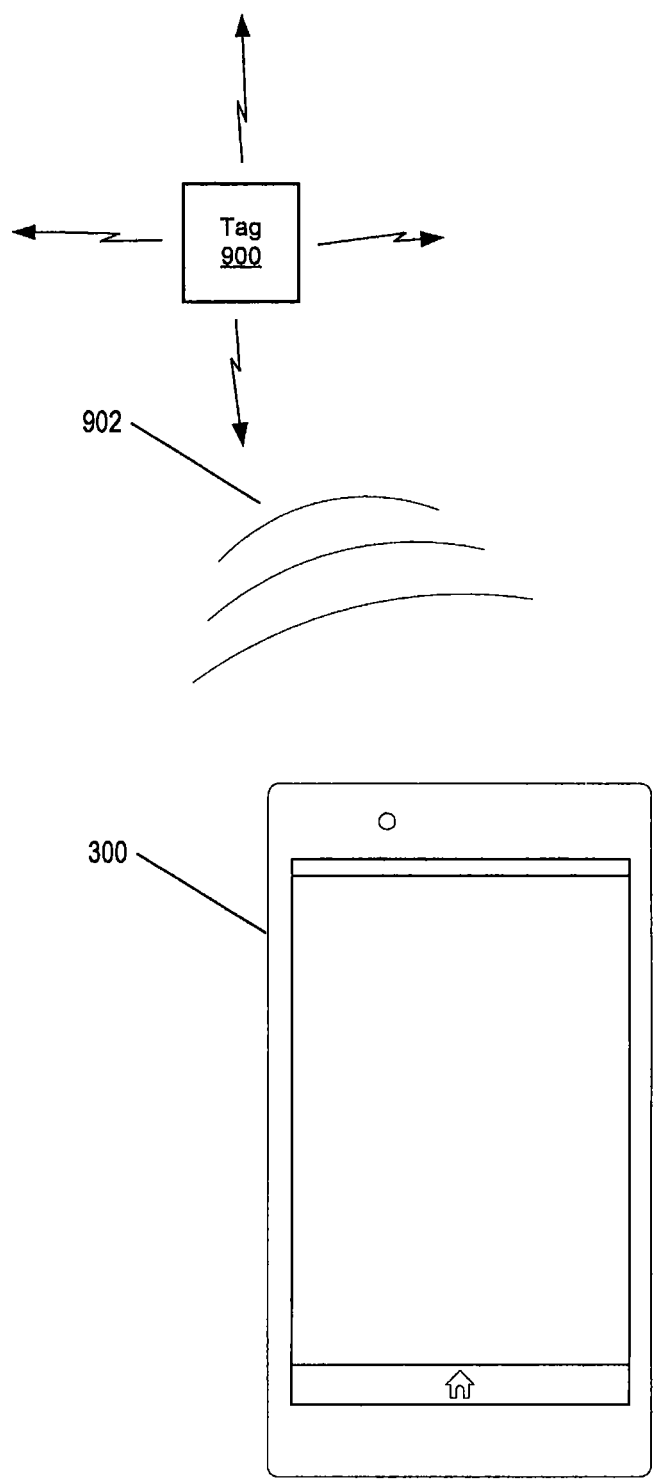
FIG. 9 is a schematic illustration of tag readers executing instructions according to some embodiments.

FIG. 8 shows a busy park location 804 with some mobile terminals sending transmission reports. Park location 804 may be a geographical area or region that is defined based on a more precise location or map coordinate location of the park. Based on the day of the week, time of day, historical patterns of tag readers or tags, or any other movement patterns or historical data, park location 804 may have become a "white space" or "white spot" where almost all mobile terminals sending transmission reports including park location 804 as the reported location are instructed to halt or reduce a frequency of sending transmission reports.

Because park location 804 is a designated white space, at least for a specified period of time, other mobile terminals not yet in the park location 804 but nearby or headed on a road or sidewalk towards park location 804 may be predicted to be in park location 804 in the near future. This prediction may also be based on historical schedules and movement patterns. Therefore, application server 320 may send instructions to be stored on a mobile terminal instructing the mobile terminal to stop sending transmission reports as soon as it arrives at park location 804. For example, mobile terminal 802 may receive instructions to halt sending transmission reports when it arrives at park location 804. This may be for the whole time it is in park location 804 or for a period of time. It may also be for only a portion of the time it is in park location 804, such as when it is in the next set of mobile terminals to take a turn sending transmission reports to application server 320 on behalf of the mobile terminals in park location 804.

Other future locations of mobile terminal 802 may be predicted to help application server 320 select mobile tag readers for instruction. For instance, mobile terminal 802 traveling in a car may be headed to a certain busy area, such as a school. Historical information (weekday mornings at 7:30 am) and geographical map information may be compared to indicate a threshold probability that mobile terminal 802 is headed to the school. There may also be multiple white spots along the travel route of mobile terminal 802. Selection of mobile terminal 802 for halting transmission reports may depend on traveled and predicted locations of mobile terminal 802.

In some embodiments, sensor data may be captured by the tag readers and forwarded in transmission reports. For example, thermometer data may be reported. However, temperatures may not fluctuate every second such that it matters to a regular user. Based on such a condition, tag readers sending transmission reports having thermometer data may be instructed to reduce a frequency of transmission, such as sending transmission reports every half hour rather than every ten seconds.

In some embodiments, application server 320 may include instructions for tag readers to pass broadcast transmission frequency information to tags for which tag readers are detecting broadcasts. For example, based on comparisons of transmission reports to reporting rules, mobile terminal 300 may be instructed to send instructions 902 to tag 900 to reduce its broadcast frequency from every 10 seconds to every ten minutes because tag 900 was on a backpack that is now sitting in a library for an extended period of time. Such instructions may also be provided to mobile tag readers that are about to enter the reported location. Such instructions may also include secure codes or other authentication information for the tags to verify and accept the instructions.

Figure 10:
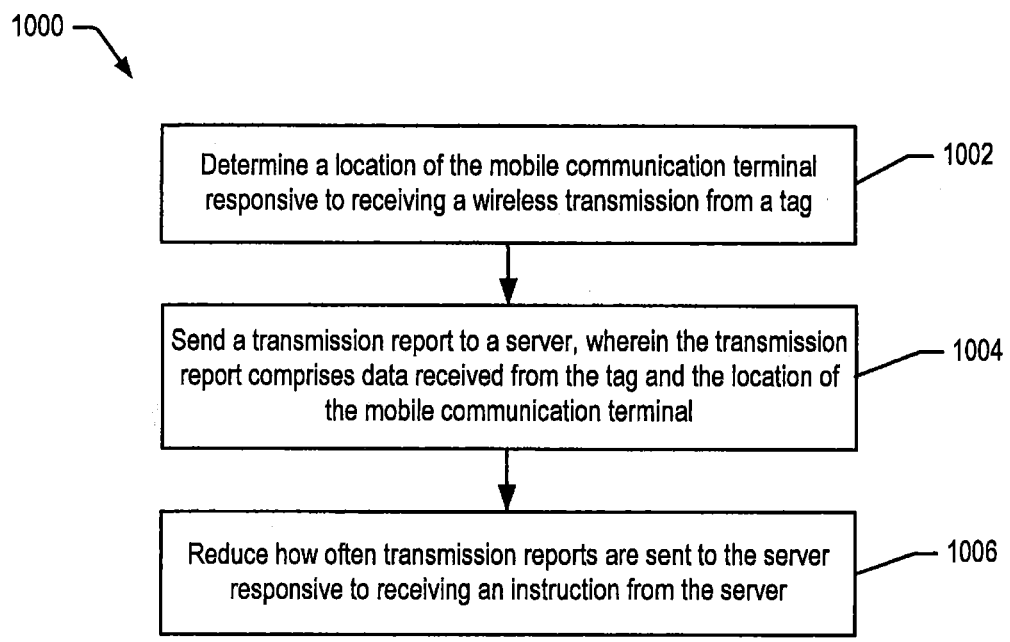
FIG. 10 is a flowchart that illustrates operations of a method for reducing sending transmission reports according to some embodiments.

FIG. 10 is a flowchart that illustrates operations of a method for reducing sending transmission reports from a perspective of tag reader 110, according to some embodiments. In block 1002, a location of mobile terminal is determined responsive to receiving a wireless transmission from a tag. In block 1004, a transmission report is sent to application server 320 with the reported location of the tag reader.

At block 1006, transmission report sending is reduced responsive to receiving an instruction from application server 320. The instruction may be carried out by an application or service on the mobile tag readers that coordinates transmission report sending with application server 320.

Figure 11:
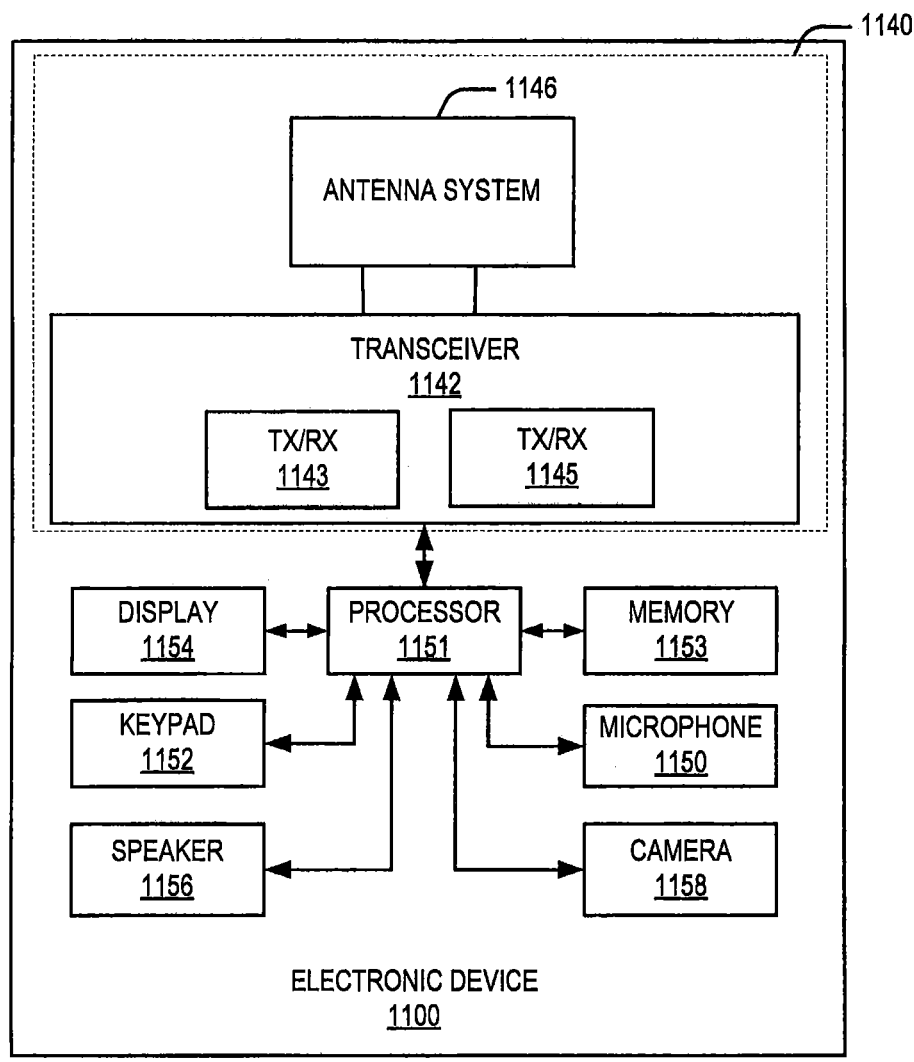
FIG. 11 is a block diagram of illustrating a computing device for implementing some embodiments.

Mobile terminal 300 may be a mobile electronic device, such as a smartphone, and include computing device and communication components as shown, for example, in FIG. 11. FIG. 11 is a schematic block diagram of an electronic device 1100, according to various embodiments. The diagram of electronic device 1100 is not limited to a mobile terminal. The diagram of electronic device 1100 may also include parts of another electronic device, such as application server 320. Electronic device 1100 may communicate using communication interface 1140. Communication interface 1140 may be used with a wireline connection, the internet, and/or a wireless local network to connect to other devices. Wireless communication protocols may include, but are not limited to, IEEE 802.11a, 802.11b, 802.11g, 802.11n, 802.11ac, Bluetooth® protocols, IEEE 802.15 protocols, near field communication (NFC) protocols, RFID protocols and/or any other wireless local area network protocols. In some embodiments, communication interface 1140 of electronic device 1100 may include an antenna system 1146 and a cellular and/or Wi-Fi transceiver 1142 (e.g., multi-band with transceivers 1143 and 1145).

Electronic device 1100 may also include other various components, such as a processor 1151, a memory 1153, display 1154, keypad 1152, speaker 1156, microphone 1150 and/or camera 1158. Some embodiments provide that the display 1154 may include a touch sensitive display or screen, or the like.

The memory 1153 stores software that may be executed by the processor 1151, and may include one or more erasable programmable read-only memories (EPROM or Flash EPROM), battery backed random access memory (RAM), magnetic, optical, or other digital storage device, and may be separate from, or at least partially within, the processor 1151. The processor 1151 may include more than one processor, such as, for example, a general purpose processor and a digital signal processor, which may be enclosed in a common package or separate and apart from one another. In particular, the processor 1151 may be configured to control various functions of electronic device 1100, including receiving input from a touch sensitive screen or other sensors.

Electronic device 1100 may communicate with a base station of a network using radio frequency signals, which may be communicated through antenna system 1146. For example, electronic device 1100 may be configured to communicate via the cellular transceiver 1142 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS), among others. Communication protocols as used herein may specify the information communicated, the timing, the frequency, the modulation, and/or the operations for setting-up and/or maintaining a communication connection. In some embodiments, the antenna system 1146 may be a single antenna.

It is to be understood that the present invention is not limited to the particular configurations shown in FIGS. 5-11, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture may be implemented as a single processor system or a multi processor system in accordance with various embodiments of the present invention.

The embodiments described herein provide various advantages. Battery power usage may be reduced for mobile terminals executing a tag tracking application administered by an application server.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A server, comprising:
   a processor;
   a memory coupled to the processor and comprising computer readable program code embodied in the memory that when executed by the processor causes the processor to perform operations comprising:
   comparing transmission reports received from one or more mobile tag readers to a reporting rule, wherein each transmission report comprises data received by a respective mobile tag reader through a wireless transmission from a tag and a reported location of the respective mobile tag reader;
   responsive to a determination that one or more of the transmission reports satisfy the reporting rule, generating an instruction that instructs a mobile tag reader to reduce how often transmission reports are sent to the server;
   selecting one or more mobile tag readers to receive the instruction based on the reported location; and
   sending the instruction to the selected one or more mobile to readers.

2. The server of claim 1, wherein the comparing comprises comparing a number of the transmission reports received for the reported location during a time period to a threshold number defined by the reporting rule, wherein the instruction is generated responsive to a determination that the number of transmission reports satisfies the threshold number.

3. The server of claim 1, wherein the comparing comprises comparing a frequency of transmission reports sent by a mobile tag reader to a threshold frequency defined by the reporting rule, wherein the instruction is generated responsive to a determination that the frequency of transmission reports sent by the mobile tag reader satisfies the threshold frequency.

4. The server of claim 1, wherein the selecting comprises selecting a group of the mobile tag readers that are within a geographical region that is defined based on the reported location.

5. The server of claim 1, wherein the instruction instructs the selected one or more mobile tag readers to halt sending of transmission reports for a time period.

6. The server of claim 1, wherein the instruction instructs the selected one or more mobile tag readers to reduce a frequency of transmission reports sent to the server while within, the geographical region.

7. The server of claim 4, wherein the operations further comprise:

sending, based on a reporting plan associated with the reporting rule, a resume instruction to the selected one or more mobile tag readers instructing the selected one or more mobile tag readers to no longer reduce how often transmission reports are sent to the server;

selecting other one or more mobile tag readers based on the reporting plan; and sending the instruction to the other one or more mobile tag readers.

8. The server of claim 1, wherein the selecting comprises selecting one or more mobile tag readers that are predicted to be in a geographical region defined based on the reported location, and wherein the instruction instructs the selected one or more mobile tag readers to reduce how often transmission reports are sent to the server within a threshold distance of the reported location.

9. The server of claim 8, wherein the instruction further instructs the selected one or more mobile tag readers to instruct the tag sending the wireless transmissions to reduce how often wireless transmissions are broadcast.

10. A method, comprising:
comparing, at a computing device, transmission reports received from one or more mobile tag readers to a reporting rule, wherein each transmission report comprises data received by a respective mobile tag reader through a wireless transmission from a tag and a reported location of the respective mobile tag reader;

responsive to a determination that one or more of the transmission reports satisfy the reporting rule, generating an instruction that instructs a mobile tag reader to reduce how often transmission reports are sent to the server;

selecting one or more mobile tag readers to receive the instruction based on the reported location; and sending the instruction to the selected one or more mobile tag readers.

11. The method of claim 10, wherein the comparing comprises comparing a frequency of transmission reports sent by a mobile tag, reader to a threshold frequency defined by the reporting rule, wherein the instruction is generated responsive to a determination that the frequency of transmission reports sent by the mobile tag reader satisfies the threshold frequency.

12. The method of claim 10, wherein the comparing comprises comparing a frequency of transmission reports sent by a mobile tag reader, wherein the instruction is generated responsive to a determination that the frequency of transmission reports sent by the mobile tag reader satisfies a threshold frequency defined by the reporting rule.

13. The method of claim 10, wherein the selecting comprises selecting a group of the mobile tag readers that are within a geographical region that is defined based on the reported location.

14. The method of claim 10, wherein the instruction instructs the selected one or more mobile tag readers to halt sending of transmission reports for a time period.

15. The method of claim 10, wherein the instruction instructs the selected mobile tag readers to reduce a frequency of transmission reports sent to the server while within the geographical region.

16. The method of claim 10, further comprising:
sending, based on a reporting plan associated with the reporting rule, a resume instruction to the selected one or more mobile tag readers instructing the selected one or more mobile tag readers to no longer reduce how often transmission reports are sent to the server;

selecting other one or more mobile tag readers based on the reporting plan; and sending the instruction to the other one or more mobile tag readers.

17. The method of claim 10, wherein the selecting comprises selecting one or more mobile tag readers that arc predicted to be in a geographical region defined based on the reported location, and wherein the instruction instructs the one or more mobile tag readers to reduce how often transmission reports are sent to the server within a threshold distance of the reported location.

18. The method of claim 17, wherein the instruction further instructs the selected one or more mobile tag readers to instruct the tag sending the wireless transmissions to reduce how often wireless transmissions are broadcast.

19. A mobile communication terminal, the mobile communication terminal comprising:
a processor;
a communication interface coupled to the processor;
a memory coupled to the processor and comprising computer readable program code embodied in the memory that when executed by the processor causes the processor to perform operations comprising:
determining a location of the mobile communication terminal responsive to receiving a wireless transmission from a tag;
sending a transmission report to a server, wherein the transmission report comprises data received from the tag and the location of the mobile communication terminal; and
reducing how often transmission reports are sent to the server responsive to receiving an instruction from the server.

20. The mobile communication terminal of claim 19, wherein the instruction instructs the mobile communication terminal to halt or reduce a frequency of transmission reports sent to the server while in a geographical location defined based on the location.

* * * * *

UNITED STATES PATENT AND TRADEMARK OFFICE
CERTIFICATE OF CORRECTION

PATENT NO. : 9,607,196 B2  
APPLICATION NO. : 14/426675  
DATED : March 28, 2017  
INVENTOR(S) : Wässingbo Page 1 of 1

It is certified that error appears in the above-identified patent and that said Letters Patent is hereby corrected as shown below:

In the Claims
Column 13, Claim 11, Line 39: Please correct "mobile tag, reader" to read -- mobile tag reader --

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*